(No Model.)
G. KENNAN.
PROCESS OF AND APPARATUS FOR TREATING ORES.
No. 540,359. Patented June 4, 1895.
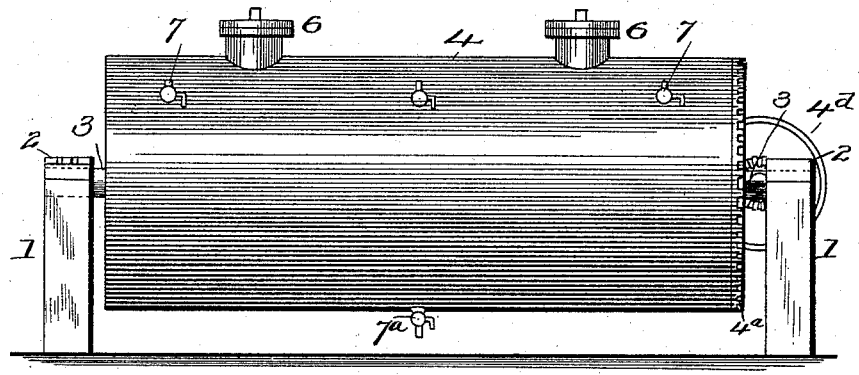
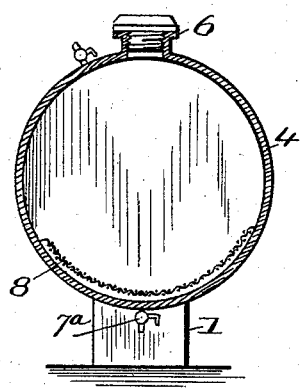
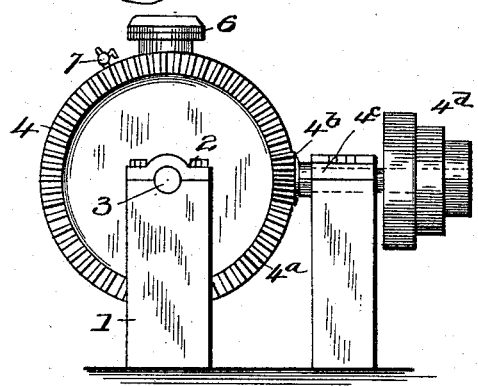
Witnesses:
J. W. Reynolds
S. H. Randall
Inventor
George Kennan
By John Wedderburn
His Attorney

UNITED STATES PATENT OFFICE.

GEORGE KENNAN, OF BOULDER, COLORADO.

PROCESS OF AND APPARATUS FOR TREATING ORES.

SPECIFICATION forming part of Letters Patent No. 540,359, dated June 4, 1895.

Application filed October 30, 1894. Serial No. 527,449. (No model.)

*To all whom it may concern:*

Be it known that I, GEORGE KENNAN, a citizen of the United States, and a resident of Boulder, in the county of Boulder and State of Colorado, have invented certain new and useful Improvements in Processes of and Apparatus for Treating Ores; and I do hereby declare the following to be a full, clear, and exact description of the invention, such as will enable others skilled in the art to which it appertains to make and use the same.

My invention relates to an improved process for treating ores of gold and silver, the same being a carrying forward or perfecting of the well known treatment of said ores by dissolving the same in cyanide of potassium. In the old method of treatment with cyanide of potassium great losses and trouble have arisen by reason of the fact that the very fine ores and talcose matter in solution known as slimes prevent percolation of the cyanide solution through the ores and thereby prevent the same from coming in contact with all parts of the ore treated. In the ordinary method of treatment displacement of the cyanide solution is depended upon by drawing off what collects at the bottom of the tank and afterward flooding with water, which is also drawn off from the bottom. The slimes, however, prevent this in a measure, as a free passage through the ore is prevented by them, and the water thereby seeks a channel around the places where the slime or talcose matter hinders the passage. It has been endeavored to facilitate the action of the cyanide by agitation, but in all such cases which have come to my knowledge the agitation is made a continuous one extending over a period of from eighteen to thirty-six hours. This has proved of benefit in some instances, while in others it has proved a great detriment. The results in any case have been far from uniform. Oxygen-producing substances have been added to the cyanide in known methods to facilitate the action of the cyanide, which have proved of some benefit. My experience, however, has taught me that to agitate from two to five minutes and then let in the air and allow the mass to stand for a short period, then agitate for a couple of minutes again, thus alternating and giving the oxygen of the atmosphere an opportunity to combine with the cyanide in its action on the gold and silver, gives far better and much more uniform results, besides saving much time in the treatment. In washing the ores by the old method, moreover, where an ordinary tank is used, it will often require from twenty-four to forty-eight hours for the water to percolate through the ore and even then the water will seek a channel and not be brought in contact with all the fine particles of the ore or slime. I have discovered further that in the washing of the solutions from the pulp much better results are obtained by agitating for a few minutes, afterward allowing the mass to settle for a period of, say five minutes, then continuing the agitation for a few minutes longer and withdrawing the solution from the bottom or sides of the tank in which the agitation is performed. In this way nearly every particle of the slimes and all solutions are carried off thereby.

My new method therefore consists in treating the gold bearing ores with cyanide of potassium, agitating for a period of from two to five minutes, allowing the same to stand for a few minutes and again agitating until all particles of the ore have been brought in contact with the cyanide solution, and afterward washing with water, agitating it first for a few minutes, then allowing the mass to settle and continue the agitation for a few minutes longer, whereby every particle of the dissolved metals is brought in contact with the water and the same are withdrawn from the bottom or sides of the tank.

The apparatus for carrying my process into effect consists of a cylindrical, square or polygonal tank mounted for rotation at its two opposite ends upon suitable supports or trunnions, the same being provided with a false bottom or screen, discharge openings in the sides of the tank for withdrawing the solution, and man-holes for filling the tank and withdrawing the remaining pulp after the ore has been treated. This apparatus is clearly illustrated in the accompanying drawings, in which—

Figure 1 represents a side elevation of the apparatus; Fig. 2, a cross-section, and Fig. 3 an end view.

Like reference-numerals indicate like parts in the various views.

1 represents a suitable frame work or support having at its upper end suitable bearings 2 in which move the trunnions 3 of the agitating cylinder 4. Upon the outer rim of the cylinder 4 is secured a beveled gear wheel $4^a$ with which engages a similar gear wheel $4^b$ mounted upon a shaft $4^c$ carrying cone-pulleys $4^d$ to which power for rotating the cylinder 4 is applied. The said cylinder or tank 4 is made of any suitable material, having man-holes 6 on its upper side through which the ore and the material with which it is treated are introduced. The cylinder or tank is further provided with a series of smaller holes or perforations 7, having valves $7^a$ therein, throughout its length from which the solutions are withdrawn. The said tank is further provided with a lining or false bottom 8 made of heavy wire screen or perforated sheet iron or steel, the same covering about one-third of the surface of the inside of the tank and being separated from said tank by a space of about three quarters of an inch to allow the solution to readily reach the aperture for discharge. This screen is covered by two thicknesses of burlap or other suitable filtering cloth to prevent the pulp or slime from passing off with the solution.

In the apparatus thus constructed my process is carried out. I first introduce the ore to be treated through the man-holes 6, apply the solution of cyanide of potassium, slowly rotating the cylindrical tank for a period of from two to five minutes. During this time the cyanide is brought in contact with all the particles of ore. The rotation is now stopped, and the tank opened to allow the ore to come in contact with the atmosphere, the oxygen thereof aiding the action of the cyanide. This is allowed to rest for about five minutes, when the tank is again rotated for a period of about two minutes longer, when it is again allowed to rest. This completes the solution of all the values in the ore. The same may now be withdrawn through the opening beneath the false bottom or screen 8, the pulp being prevented from discharge through said opening by means of the burlap covering of the said false bottom. Of course, certain values are left remaining in solution in the tank in the form of slimes, which necessitate washing with water to remove the same therefrom. I now apply water through the man-holes 6 or in any convenient way. The water being introduced, the tank is again rotated slowly, which brings every particle of the slimes in contact with the water. This is continued for a period of about five minutes, when the rotation is stopped and the water withdrawn in the same manner as the cyanide solution heretofore referred to.

This combined percolating, filtering and agitating tank obviates all necessity for the rehandling of the materials treated and also makes it practicable to give a preliminary wash to the ore with pure water or an alkaline or caustic solution in the most efficient manner at the least possible expense and with the consumption of the smallest amount of time. It further provides for the alternation of the action of the cyanide and oxygen of the atmosphere in such a manner as to greatly facilitate the action and increase the efficiency of the cyanide, thus obviating the necessity of using artificially produced oxygen.

By the use of this tank all channeling is prevented and it effectually brings each particle of ore in contact with the cyanide solution for dissolving the gold and silver, and also in contact with the water when used in washing in such a manner as to remove the gold held in solution where it could not be done otherwise, thereby saving a higher percentage of values and also a large per cent. of time as ordinarily used. The discharge of the contents of the tank can be accomplished in less time, with less labor and with less water than by sluicing or by any other device known to me.

Having now described my invention, what I claim as new, and desire to secure by Letters Patent, is—

1. The herein described process of treating the ores of gold and silver consisting in subjecting the same to the action of cyanide of potassium, agitating the same for a short period of time, discontinuing the agitation, and bringing air in contact therewith, the oxygen thereof increasing the action of the cyanide, continuing the agitation for a few minutes, until every particle of ore has been brought in contact with the cyanide solution in the presence of atmospheric air, and withdrawing the solution from the remaining pulp or ore, substantially as and for the purpose described.

2. The herein described process of treating the ores of gold and silver, consisting in subjecting the same to the action of cyanide of potassium, agitating the same for a short period of time, discontinuing the agitation, and bringing air in contact therewith, the oxygen thereof increasing the action of the cyanide, continuing the agitation for a few minutes, until every particle of ore has been brought in contact with the cyanide solution in the presence of atmospheric air, withdrawing the solution from the remaining pulp or ore, washing the remaining pulp or ore with water, agitating the same for a short period of time to bring every particle of dissolved values in contact with the water, discontinuing the agitation and withdrawing the slimes from the water, substantially as and for the purpose described.

In testimony whereof I have signed this specification in the presence of two subscribing witnesses.

GEORGE KENNAN.

Witnesses:
J. H. NICHOLSON,
C. W. EMERSON.